(12) United States Patent
Cooper

(10) Patent No.: US 9,751,715 B2
(45) Date of Patent: Sep. 5, 2017

(54) WIRE GUIDE MODULE AND SYSTEM

(75) Inventor: Edward L. Cooper, Clarklake, MI (US)

(73) Assignee: ELCO ENTERPRISES, INC., Jackson, MI (US)

( * ) Notice: Subject to any disclaimer, the term of this patent is extended or adjusted under 35 U.S.C. 154(b) by 376 days.

(21) Appl. No.: 13/538,509

(22) Filed: Jun. 29, 2012

(65) Prior Publication Data

US 2013/0168479 A1 Jul. 4, 2013

Related U.S. Application Data

(60) Provisional application No. 61/505,854, filed on Jul. 8, 2011, provisional application No. 61/514,119, filed on Aug. 2, 2011.

(51) Int. Cl.
| | | |
|---|---|---|
| *B65H 51/02* | (2006.01) | |
| *B65H 57/14* | (2006.01) | |
| *B23K 9/12* | (2006.01) | |
| *B23K 9/133* | (2006.01) | |

(52) U.S. Cl.
CPC ............. *B65H 51/02* (2013.01); *B23K 9/122* (2013.01); *B23K 9/124* (2013.01); *B23K 9/1336* (2013.01); *B65H 57/14* (2013.01); *B65H 2701/36* (2013.01)

(58) Field of Classification Search
CPC ........ B65H 57/14; B65H 57/12; B65H 51/02; Y10T 74/20444; B66D 1/36; B23K 9/122
USPC ...... 242/615, 615.1, 615.2, 615.3, 566, 548, 242/548.1
See application file for complete search history.

(56) References Cited

U.S. PATENT DOCUMENTS

| | | | | |
|---|---|---|---|---|
| 298,241 | A * | 5/1884 | Schneider | B66D 1/36 114/101 |
| 534,021 | A | 2/1895 | Swan | |
| 1,898,060 | A * | 2/1933 | Noble | 314/13 |
| 2,694,130 | A * | 11/1954 | Howard | 219/137.44 |
| 2,816,734 | A * | 12/1957 | Crofoot | 242/615.2 |
| 2,926,001 | A * | 2/1960 | Mack et al. | 74/469 |
| 3,344,682 | A * | 10/1967 | Bratz | 74/502.3 |
| 3,491,876 | A * | 1/1970 | Zecchin | B65D 85/04 206/395 |
| 3,576,966 | A * | 5/1971 | Sullivan | 219/137 R |
| 3,720,070 | A * | 3/1973 | Raves | B65H 57/00 226/25 |
| 3,901,425 | A | 8/1975 | Taylor et al. | |
| 3,901,479 | A * | 8/1975 | Arnold | B66D 1/36 226/45 |
| 4,102,483 | A * | 7/1978 | Ueyama et al. | 228/244 |

(Continued)

FOREIGN PATENT DOCUMENTS

| | | |
|---|---|---|
| JP | 03-297568 | 12/1991 |
| JP | 03297568 A | 12/1991 |
| JP | 2000117440 A | 4/2000 |

*Primary Examiner* — Emmanuel M Marcelo
*Assistant Examiner* — Michael Gallion
(74) *Attorney, Agent, or Firm* — Brinks Gilson & Lione

(57) ABSTRACT

A wire guide module for guiding and changing the direction of wire in a wire dispensing system. The wire guide module having an inner passageway with rollers. The rollers adjacent the inner passageway assist the wire in moving smoothly through the wire guide module as the shape of the inner passageway changing the direction of movement of the wire. A wire dispensing system having wire guide modules with rollers which change the direction of the wire while reducing damage to the wire.

26 Claims, 10 Drawing Sheets

(56) References Cited

U.S. PATENT DOCUMENTS

| | | | |
|---|---|---|---|
| 4,189,106 A * | 2/1980 | Weis | B21C 47/143 |
| | | | 242/361 |
| 4,440,485 A * | 4/1984 | Maldonado et al. | 396/622 |
| 4,546,631 A * | 10/1985 | Eisinger | B21F 1/04 |
| | | | 72/135 |
| 4,552,323 A * | 11/1985 | Otis | B65H 57/14 |
| | | | 242/129.5 |
| 4,730,855 A * | 3/1988 | Pelletier | 285/179 |
| 5,016,924 A | 5/1991 | Lin | |
| 5,029,817 A | 7/1991 | Tamm | |
| 5,159,849 A * | 11/1992 | Womack | F16C 1/20 |
| | | | 138/103 |
| 5,220,850 A * | 6/1993 | Fawcett | F16C 1/20 |
| | | | 74/502.3 |
| 5,585,013 A * | 12/1996 | Truty | 219/69.12 |
| 5,676,010 A * | 10/1997 | College | B21F 1/02 |
| | | | 72/162 |
| 6,318,614 B1 | 11/2001 | Boyd | |
| 6,524,010 B1 * | 2/2003 | Derman | 384/513 |
| 6,729,606 B1 * | 5/2004 | Durin | 254/395 |
| 7,374,074 B2 | 5/2008 | Matiash | |
| 7,389,900 B2 | 6/2008 | Matiash | |
| 7,861,567 B2 * | 1/2011 | Chang | B21B 39/20 |
| | | | 242/615.2 |
| 8,453,960 B2 * | 6/2013 | Gelmetti et al. | 242/615.2 |
| 8,674,263 B2 * | 3/2014 | Gelmetti | B23K 9/133 |
| | | | 219/136 |
| 8,702,067 B2 * | 4/2014 | Meijer | 254/385 |
| 2002/0120178 A1 * | 8/2002 | Tartaglia et al. | 600/114 |
| 2005/0127233 A1 | 6/2005 | Hsu et al. | |
| 2009/0065200 A1 * | 3/2009 | Howard | B65H 57/04 |
| | | | 166/255.1 |
| 2009/0200284 A1 * | 8/2009 | Sanchez | 219/137.51 |
| 2010/0116803 A1 * | 5/2010 | Gelmetti | 219/138 |
| 2011/0042254 A1 * | 2/2011 | Gelmetti | B23K 9/133 |
| | | | 206/398 |
| 2011/0042355 A1 * | 2/2011 | Gelmetti | 219/73 |
| 2011/0073703 A1 * | 3/2011 | Gelmetti et al. | 242/615.2 |
| 2011/0132880 A1 * | 6/2011 | Kossowan | 219/76.14 |
| 2011/0315266 A1 * | 12/2011 | Viviroli | B65H 57/14 |
| | | | 140/147 |
| 2014/0216594 A1 * | 8/2014 | Mizutani | B65H 57/04 |
| | | | 140/147 |

\* cited by examiner

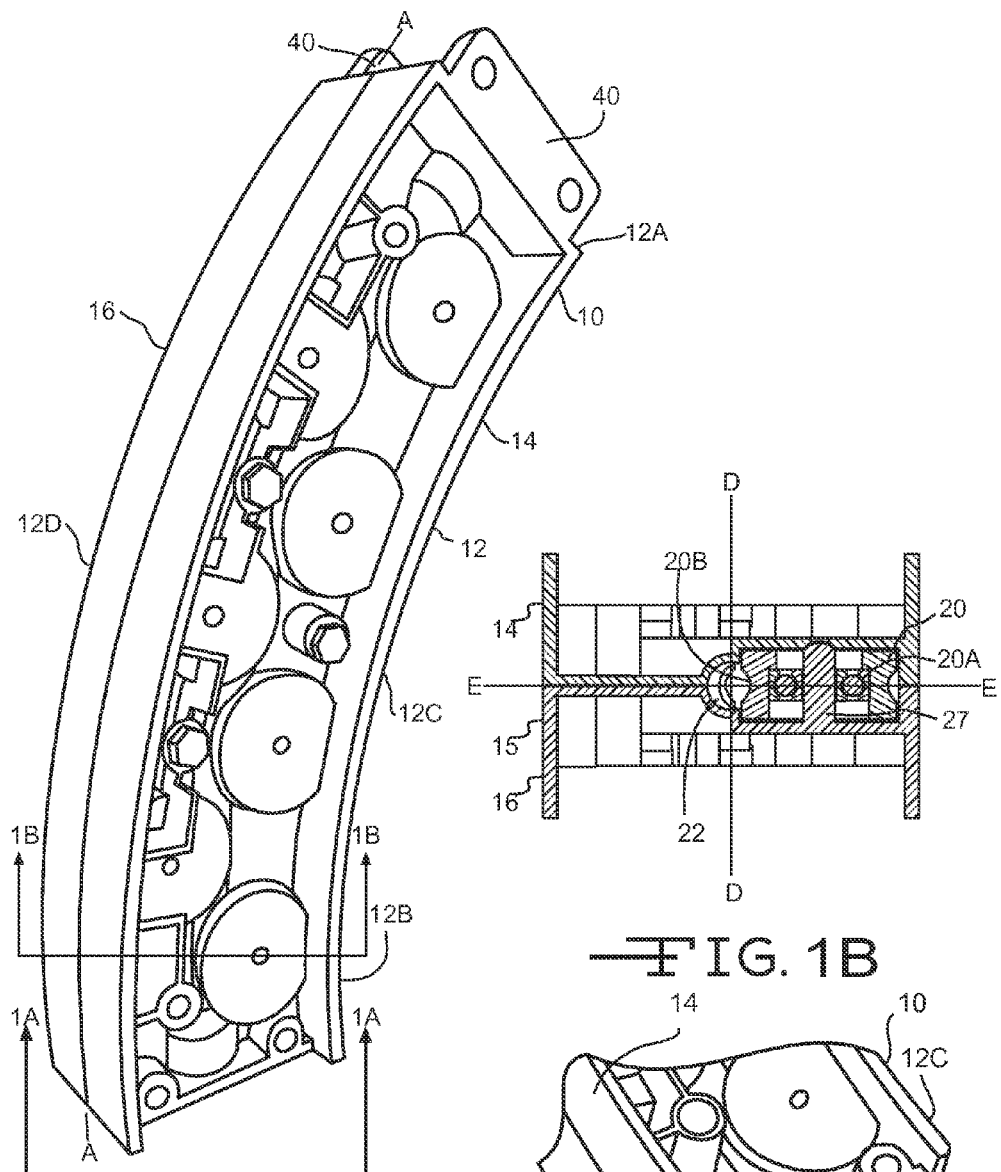
FIG. 1
FIG. 1B
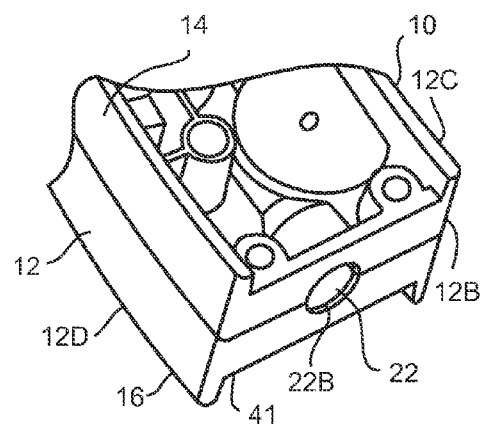
FIG. 1A

WIRE GUIDE MODULE AND SYSTEM

CROSS REFERENCES TO RELATED APPLICATIONS

This application claims the benefit of U.S. Provisional Application No. 61/505,854, filed Jul. 8, 2011 and U.S. Provisional Application No. 61/514,119 filed Aug. 2, 2011 which are hereby incorporated herein by reference in their entirety, except that the present application supersedes any portion of the above referenced applications which is inconsistent with the present application.

STATEMENT REGARDING FEDERALLY SPONSORED RESEARCH OR DEVELOPMENT

Not Applicable

BACKGROUND OF THE INVENTION

Field of the Invention

The present invention relates to a wire guide module for use in a wire dispensing system. In particular, the present invention relates to wire guide module which changes a direction in which the wire is moving and which has rollers to assist the wire in moving through the wire guide module. The present invention also relates to a system which uses the wire guide modules and conduit to dispense wire from a wire source to a welding station.

There remains a need for a wire guide module which enables the direction of wire in a wire dispensing system to be changed without substantially increasing the drag on the wire.

BRIEF SUMMARY OF THE INVENTION

A wire guide module for guiding and changing the direction of wire as the wire moves through a wire dispensing system. The wire guide module includes a housing with an inner passageway extending between the ends of the housing and having rollers in the housing adjacent the inner passageway. The housing has openings at each end which allow access into and out of the inner passageway. In one (1) embodiment, the inner passageway has an arcuate shape between the ends of the housing. The rollers are mounted in roller chambers in the housing and freely rotate in the roller chambers. The rollers extend into the inner passageway. In one (1) embodiment, the rollers have a groove in the outer surface and the bottom of the groove is essentially in the vertical center of the inner passageway. In one (1) embodiment, the rollers are positioned on both sides of the inner passageway and are positioned between the inner side of the housing and the inner passageway and between the outer side of the housing and the inner passageway. In one (1) embodiment, the wire guide module has a male end and a female end which allows for easily connecting two wire guide modules together to form wire guide components having a variety of shapes. The wire guide module can be used in any orientation and the wire can move through the wire guide module in either direction. Optionally end caps are mounted on the ends of the housing to enable the wire guide module to be easily connected to other components of the wire dispensing system. In one (1) embodiment, the end caps have fittings which mate with fittings of the other components of the wire dispensing system.

The housing of the wire guide module can be constructed of a first section and a second section. Construction of the wire guide module as two sections enables easier mounting of the rollers in the housing and enables replacement of the rollers or adjustment of the size of the rollers to accommodate different sized wire. The first section of the housing has the first section of the inner passageway and the first section of the roller chambers. The second section of the housing has the second section of the inner passageway and the second section of the roller chambers. In one (1) embodiment the first and second sections of the housing are essentially identical except that the second section of the housing includes mounting posts for mounting the rollers.

The wire guide module can be part of a wire dispensing system which moves wire from a wire source to a welding station. Other parts of the wire dispensing system can include a movement means for moving the wire such as a motor or any other movement means well known in the art, conduit, brackets and a container for holding the wire source. The conduit can be connected to the ends of the wire guide module. The wire guide modules allow the direction of the wire in the wire dispensing system to be changed without creating excessive drag on the wire. The wire guide modules enable the wire dispensing system to have a variety of shapes. As the wire moves through the inner passageway of the wire guide module, the wire contacts the rollers which rotates the rollers to reduce the drag on the wire as the wire moves through the inner passageway of the housing of the wire guide module and the direction of the wire is changed.

The present invention relates to a wire guide module comprising a housing having a first end and a second end with a first side and a second side extending between the ends, an inner passageway extending through the housing between the ends of the housing with openings in the first and second ends of the housing in communication with the inner passageway and a plurality of rollers mounted in the housing adjacent the inner passageway. The wire guide module has at least one roller positioned between the first side of the housing and the inner passageway along a length of the inner passageway between the ends of the housing and at least one roller positioned between the second side of the housing and the inner passageway such that the rollers are on opposite sides of the inner passageway. In one (1) embodiment, the rollers of the wire guide are mounted on alternate sides of the inner passageway along the length of the inner passageway between the ends of the housing so that a first roller positioned between the first side of the housing and the inner passageway and a second roller directly adjacent the first roller along the length of the inner passageway is positioned between the second side of the housing and the inner passageway. The housing has a first surface and a second surface extending between the ends and the sides of the housing. In one (1) embodiment, the first end of the housing has a first connector flange extending outward from the first surface and a second connector flange extending outward from the second surface in a direction away from the second end of the housing. In this embodiment, the first connector flange is spaced apart and parallel to the second connector flange. The second end of the housing of the wire guide module has notches in the first and second surfaces of the housing. The rollers are positioned along a length of the inner passageway between the first and second ends of the housing such that the rollers do not overlap along the length of the inner passageway. In one (1) embodiment, the rollers extend into the inner passageway. In one (1) embodiment, the rollers have a cylindrical shape with an outer surface having a groove and are positioned adjacent the inner passageway so that a bottom of the groove is in the inner passageway. In one (1) embodiment the bottom of the groove of the rollers is essentially at a horizontal center of the inner passageway spaced between a first and second surfaces of the housing. In one (1) embodiment the rollers have a roller housing rotatably mounted on an inner bearing. In one (1) embodiment, the housing has roller chambers having mounting posts, and the inner bearings of the rollers have a center opening and the rollers are rotatably mounted in the roller chambers so that the mounting posts extend through the center opening of the inner bearings. The rollers are mounted on the mounting posts so as to freely rotate on the mounting posts. A first end cap having a passageway with a fitting in the passageway is optionally mounted on the first end of the housing so that the passageway of the first end cap is in communication with the inner passageway of the housing. The first end cap has notches at one end which mate with the connector flanges on the first end of the housing to connect the first end cap to the first end of the housing. Optionally, a second end cap having extensions which extend outward from one end of the second end cap in a spaced apart parallel relationship is mounted on the second end of the housing. In one (1) embodiment, an insert having a center bore is mounted in and extends into and between the inner passageway of housing and the passageway of the first end cap. In one (1) embodiment the ends of the inner passageway adjacent the ends of the housing are enlarged so that the openings at each end of the housing into the inner passageway have a cross-sectional size greater than a cross-sectional size of the inner passageway. In one (1) embodiment where the inner passageway has a cylindrical shape, a diameter of the openings in the ends of the housing is greater than a diameter of the inner passageway. In one (1) embodiment, the housing has a fixed arcuate shape between the ends. In one (1) embodiment, the inner passageway has an arcuate shape along a length of the inner passageway between the ends of the housing. In one (1) embodiment, the inner passageway is evenly spaced between the sides of the housing so that a longitudinal shape of the inner passageway is substantially similar to the shape of the housing between the ends. In one (1) embodiment, a longitudinal center of the housing is essentially aligned with and the same as the longitudinal center of the inner passageway of the housing. In one (1) embodiment, the housing has a first section and a second section which are removably connected together along a plane extending between the sides and ends of the housing to form the housing. In this embodiment, the first section of the housing has a first section of the inner passageway and the second section of the housing has a second section of the inner passageway.

Further, the present invention relates to a method for guiding wire from a wire source to a weld station, which includes the steps of providing a container for the wire source, providing a wire guide module having a housing having a first end and a second end with a first side and a second side extending between the ends, an inner passageway extending through the housing between the ends and the sides of the housing and having openings in the first and second ends of the housing in communication with the inner passageway, and a plurality of rollers mounted in the housing adjacent the inner passageway, providing a first end cap having a passageway and adapted to be mounted on the first end of the housing of the wire guide module, providing a second end cap having a passageway and adapted to be mounted on the second end of the housing of the wire guide module, providing a conduit having opposed ends with a passageway extending therebetween, connecting the wire guide module, end caps and conduit together in a correct configuration between the container and the weld station, so that the inner passageway of the wire guide module is in communication with the passageways of the end caps and conduit and feeding the wire from the wire source in the container through the passageways of the wire guide module, end caps and conduit to the weld station. In one (1) embodiment, the wire guide module has an arcuate shape with a first side of the housing being curved and shorter than a curved second, side of the housing. In this embodiment, the inner passageway of the housing has an arcuate shape. In this embodiment as the wire moves through the wire guide module, the direction, of the wire is changed and the wire contacts the rollers positioned between the first side of the housing and the inner passageway. In one (1) embodiment, two essentially identical wire guide modules are connected together so that a first end of one wire guide module is connected to a second end of the other wire guide module so that a first side of a housing of one wire guide module is adjacent a first side of the housing of the other second wire guide module so that an inner passageway of one of the wire guide modules is in communication with an inner passageway of the other of the wire guide modules forming a wire guide component having an inner passageway with a curve greater than the curve of the inner passageways of the individual wire guide modules. In one (1) embodiment two essentially identical wire guide modules are connected together so that a first end of one wire guide module is connected to a second end of the other wire guide module and a first side of a housing of the one wire guide module is adjacent a second side of the housing of the other wire guide module so that an inner passageway of one of the wire guide modules is in communication with an inner passageway of the other of the wire guide modules forming a wire guide component having an inner passageway with an S-shape.

Still further, the present invention relates to a wire dispensing system for use in welding which comprises a wire dispensing container configured to hold a supply of wire, a wire guide module having first and second ends with an inner passageway extending between the ends, and connected at the first end to the wire dispensing container with rollers adjacent the inner passageway and configured to contact the wire and rotate with the wire as the wire moves from the wire dispensing container through the wire guide module to reduce drag on the wire, and conduit connected to the second end of the wire guide module and having a passageway configured to allow wire to move from the wire guide module through the conduit. In one (1) embodiment of the system, a first end cap is mounted between the first end of the wire guide module and the wire dispensing container. In this embodiment, the first end cap has a fitting which connects to a fitting on the wire dispensing container. In one (1) embodiment of the system, a second end cap is mounted between the second end of the wire guide module and the conduit and the end cap has a fitting which connects to the conduit.

The substance and advantages of the present invention will become increasingly apparent by reference to the following drawings and the description.

BRIEF DESCRIPTION OF THE DRAWINGS

FIG. 1 is a perspective view of the wire guide module 10.

FIG. 1A is an end view along the line 1A-1A of FIG. 1 showing the opening 22B into the inner passageway 22 of the wire guide module 10.

FIG. 1B is a cross sectional view along the line 1B-1B of FIG. 1 showing the groove 20B in the outer surface 20A of the roller 20 positioned in the inner passageway 22.

DETAILED DESCRIPTION OF THE INVENTION

Figure 12:
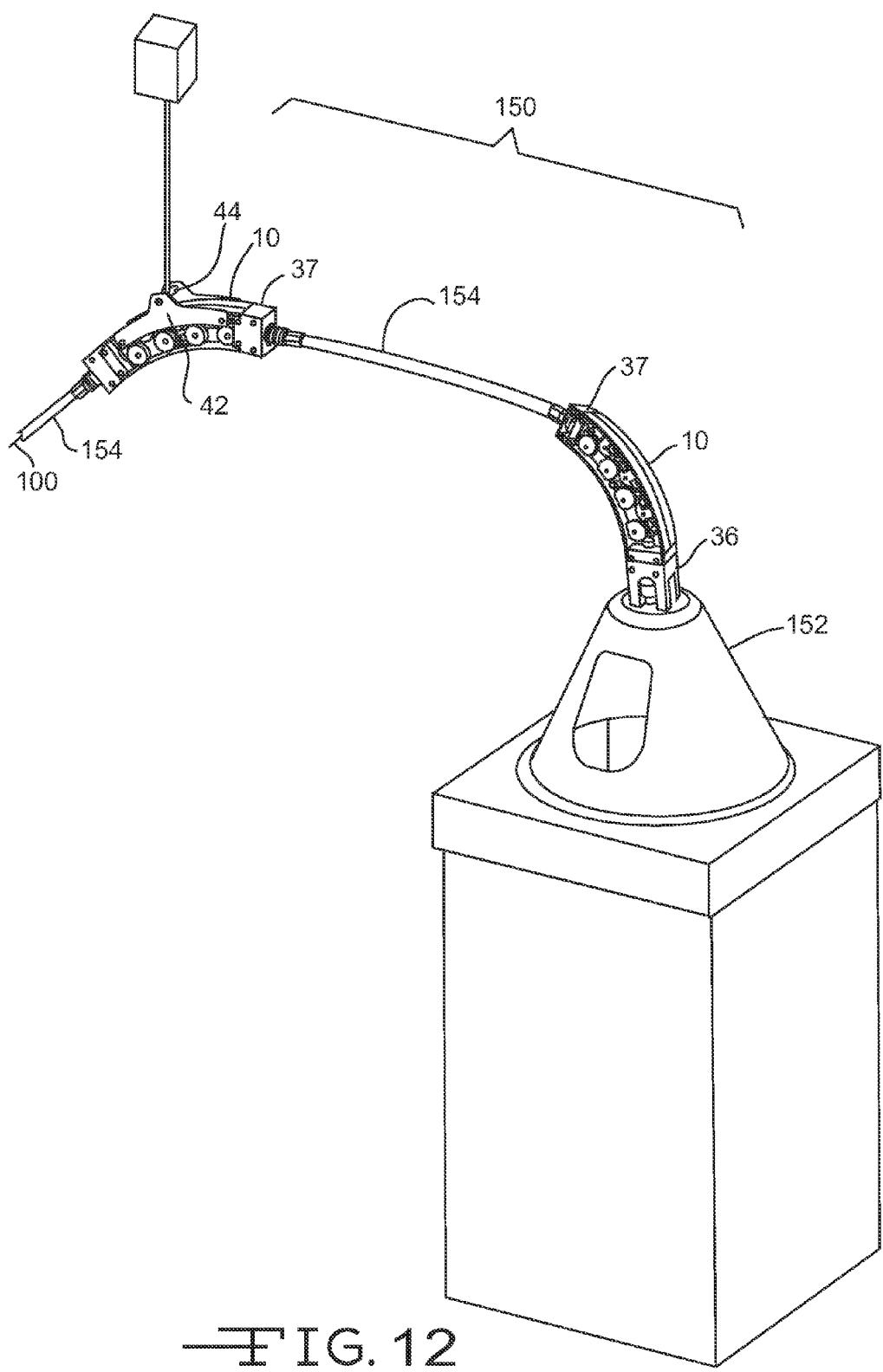
FIG. 12 is a schematic view of a wire dispensing system 150 having wire guide modules 10.

FIGS. 1 to 5 show the wire guide module 10 of the present invention. FIG. 12 shows the wire guide system 150 of the present invention. The wire guide module 10 guides the wire 100, changes the direction of the wire 100 and helps the wire 100 in a wire dispensing system 150 move more easily through the system 150. In one (1) embodiment, the wire guide module 10 is used in a wire dispensing system 150 for dispensing wire 100 from a wire source to a welding station for use in welding.

Figure 2:
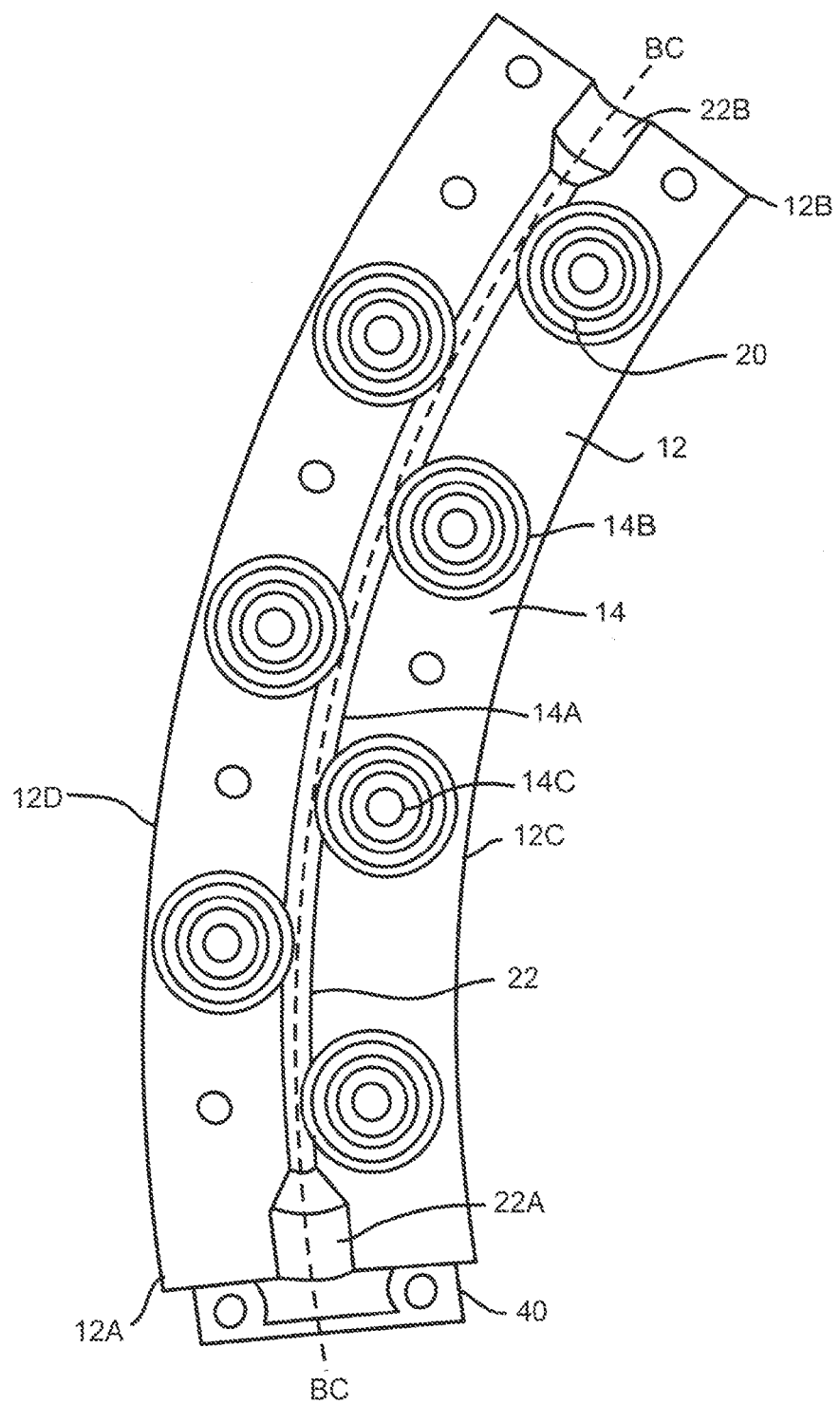
FIG. 2 is a top view of the first section 14 of the housing 12 of the wire guide module 10.
Figure 3:
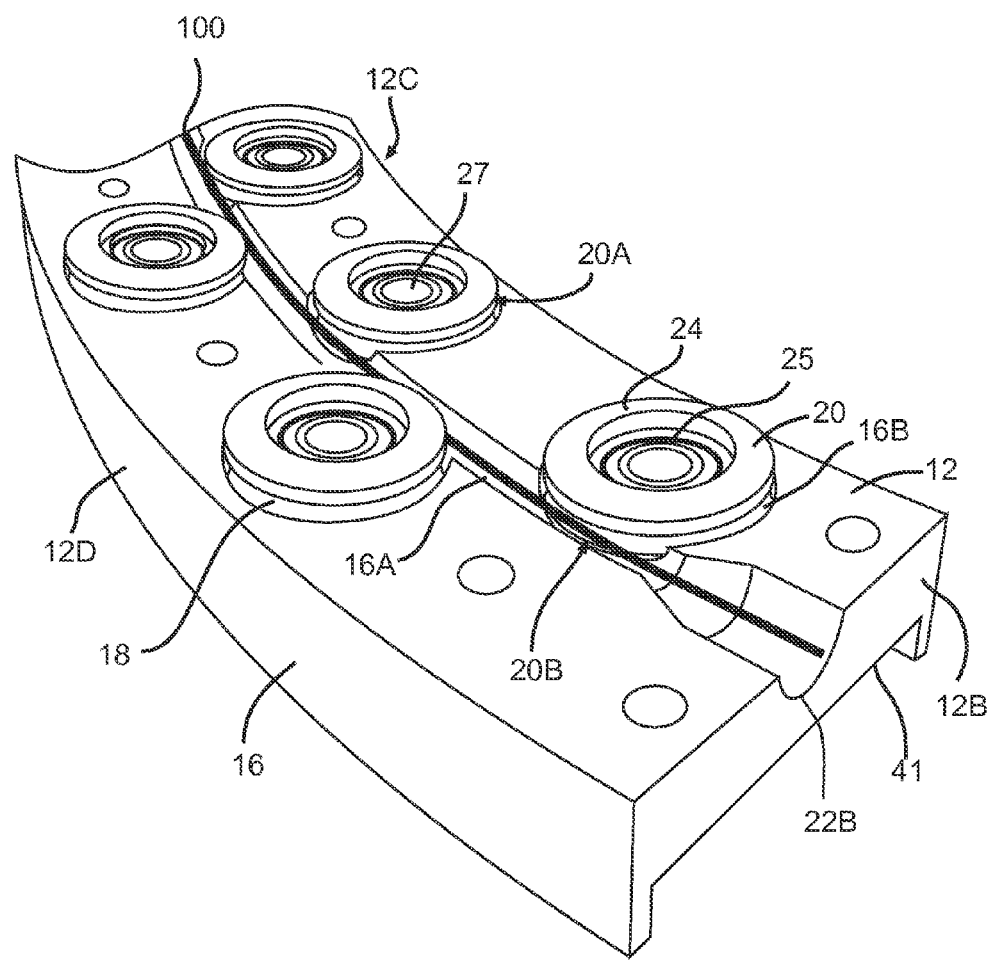
FIG. 3 is a partial view of the second section 16 of the housing 12 of the wire guide module 10 showing the wire 100 in the second section 16A of the inner passageway 22 in contact with the rollers 20 adjacent the inner side 12C of the housing 12.
Figure 4:
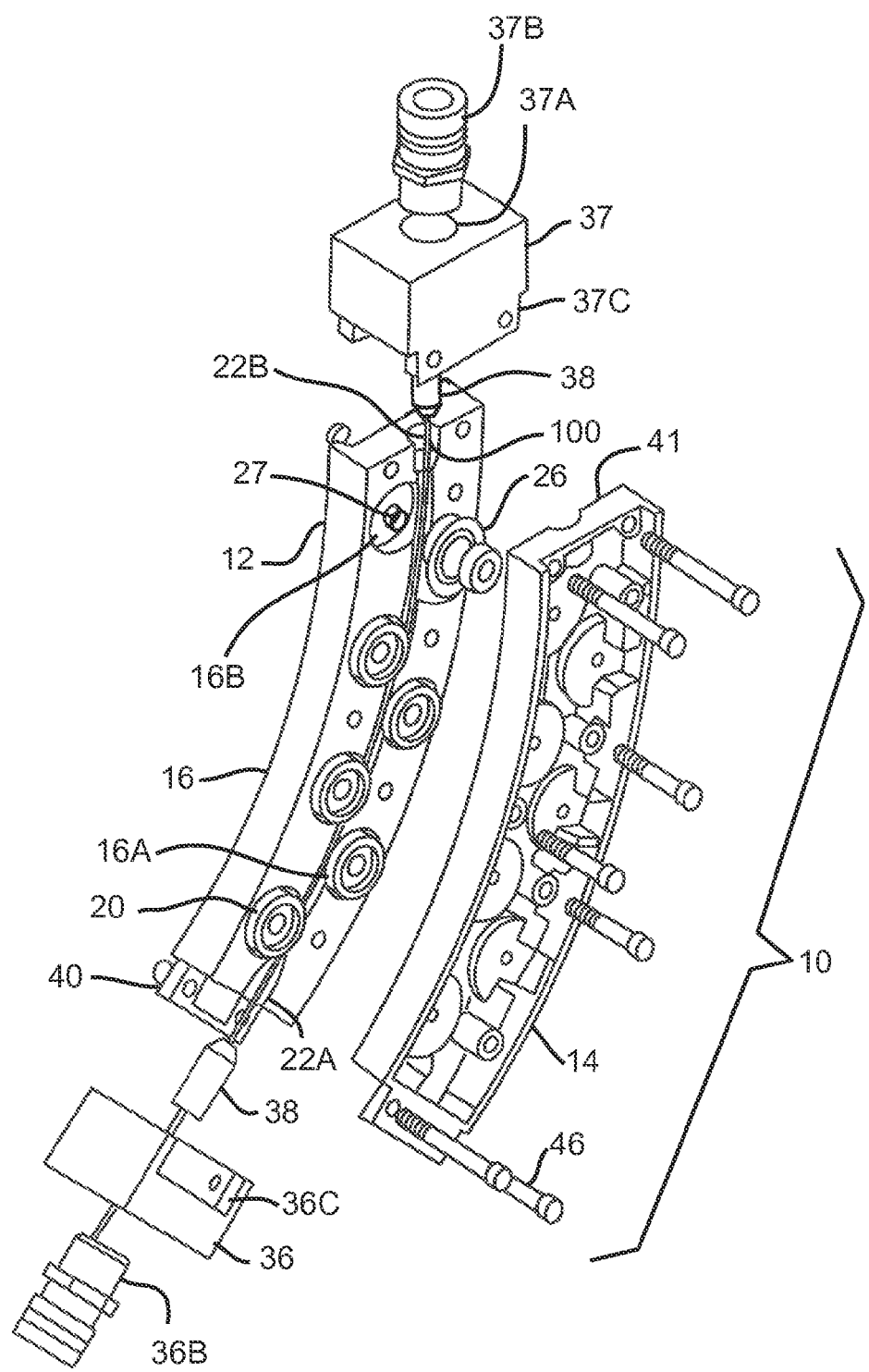
FIG. 4 is an exploded view of the wire guide module 10 showing the fittings 36B and 37B in the end caps 36 and 37, showing the inserts 38 in the ends 22A and 22B of the inner passageway 22 and showing the rollers 20.
Figure 5:
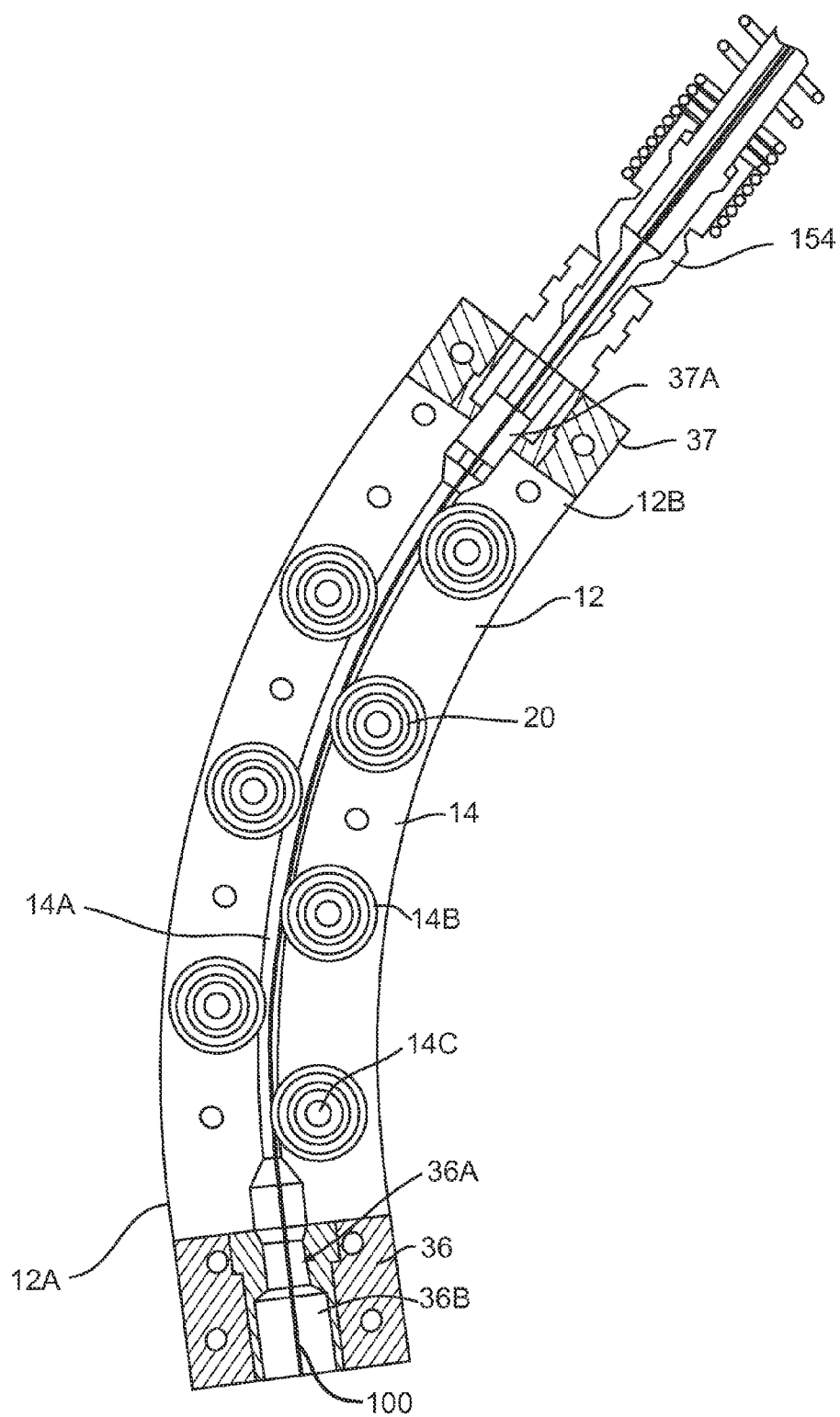
FIG. 5 is a top cross sectional view showing the first section 14 of the housing 12 of the wire guide module 10, showing the end caps 36 and 37 in cross section at both ends 12A and 12B of the housing 12 and showing the conduit connection 154.

The wire guide module 10 includes a housing 12 having an inner passageway 22 with rollers 20 mounted in the housing 12 adjacent the inner passageway 22 (FIG. 4). The housing 12 has a first end 12A and a second end 12B with an inner side 12C and an outer side 12D extending therebetween and a top and bottom surface extending between the ends 12A and 12B and the sides 12C and 12D. The inner passageway 22 extends between the ends 12A and 12B of the housing 12 spaced between the inner and outer sides 12C and 12D of the wire guide module 10. In one (1) embodiment, the inner passageway 22 is located substantially through the longitudinal center B-B of the housing 12. In one (1) embodiment, the longitudinal center B-B of the housing 12 is essentially the longitudinal center C-C of the inner passageway 22 (FIG. 2). In one (1) embodiment, the inner passageway 22 is evenly spaced between the sides 12C and 12D of the housing 12 along a length of the housing 12 between the ends 12A and 12B of the housing 12 so that the longitudinal shape of the inner passageway 22 is substantially similar to the longitudinal shape of the housing 12 between the ends 12A and 12B. The openings 22A and 22B leading into the inner passageway 22 are located in each end 12A and 12B of the housing 12. The openings 22A and 22B are in communication with and lead into the inner passageway 22. In one (1) embodiment, the inner passageway 22 has a circular cross section. In one (1) embodiment, the inner passageway 22 has a cross sectional shape similar to the cross sectional shape of the wire 100. In one (1) embodiment, the size of the inner passageway 22 is selected based on the size or diameter or the wire 100. However, it is understood that the inner passageway 22 can have a variety of shapes and sizes. In one (1) embodiment, the ends of the inner passageway 22 adjacent the ends 12A and 12B of the housing 12 forming the openings 22A and 22B into the inner passageway 22 are enlarged and have a size greater than the size of the remainder of the inner passageway 22 so as to enable easier feeding of the wire 100 into the inner passageway 22. In one (1) embodiment where the inner passageway 22 has a cylindrical shape, the diameter of the openings 22A and 22B to the inner passageway 22 is greater than the diameter of the remainder of the inner passageway 22.

The rollers 20 are spaced apart between the ends 12A and 12B of the housing 12 adjacent the inner passageway 22. In one (1) embodiment, the rollers 20 are rotatably mounted in roller chambers 18 in the housing 12. In this embodiment, the housing 12 has multiple roller chambers 18 with each roller 20 mounted in a separate roller chamber 18. The size and positioning of the rollers 20 is such that the rollers 20 extend into the inner passageway 22. The rollers 20 are positioned adjacent and extend into the inner passageway 22 so that the wire 100 contacts the outer surface 20A of the roller 20 and not the side of the inner passageway 22. In one (1) embodiment, a height of the outer surface 20A of the roller 20 is essentially equal to a height of the inner passageway 22 between the top and bottom surfaces of the housing 12 so that the roller 20 extends the complete height of the inner passageway 22. In one (1) embodiment, the rollers 20 extend into the inner passageway 22 such that the perimeter or edge of the outer surface 20A of the rollers 20 is essentially located at the longitudinal center C-C of the inner passageway 22 spaced between the sides 12C and 12D of the housing 12 (FIG. 2). In one (1) embodiment, the rollers 20 do not extend the complete width of the inner passageway 22. In one (1) embodiment, the outer surface 20A of the rollers 20 have a groove 20B which extends around the entire perimeter or circumference of the rollers 20. In one (1) embodiment, the rollers 20 are positioned so that the bottom of the groove 20B on the outer surface 20A of the roller 20 is essentially aligned with and forms part of the sides of the inner passageway 22. In one (1) embodiment, a height of the groove 20B of the roller 20 is essentially equal to the height of the inner passageway 22 extending between the top and bottom surfaces of the housing 12. In one (1) embodiment, the height of the groove 20B of the roller 20 is slightly greater than the height of the inner passageway 22 so as to ensure that the groove 20B covers the entire height of the inner passageway 22. In one (1) embodiment, the rollers 20 are positioned adjacent the inner passageway 22 such that the bottom of the groove 20B extends into the inner passageway 22 so that the wire 100 contacts the bottom of the groove 20B of the rollers 20 and not the sides of the inner passageway 22. In one (1) embodiment, the groove 20B in the outer surface 20A of the roller 20 prevents the wire 100 from contacting a top or bottom of the inner passageway 22 adjacent a top surface and bottom surface of the housing 12. In one (1) embodiment, the rollers 20 extend into the inner passageway 22 such that the bottom of the groove 20A is essentially located at the longitudinal center C-C of the inner passageway 22 and the sides of the rollers 20 forming the sides of the groove 20B extend beyond the longitudinal center C-C of the inner passageway 22. In one (1) embodiment, the center of the bottom of the groove 20B or the deepest part of the groove 20B of the rollers 20, is essentially in a vertical center D-D of the inner passageway 22 spaced between the top and bottom surfaces of the housing 12. In one (1) embodiment, the center of the bottom of the groove 20B or the deepest part of the groove 20B of the rollers 20 is essentially in a horizontal center E-E of the inner passageway 22 spaced between the sides 12C and 12D of the housing 12.

In one (1) embodiment, the groove 20B has a U-shape. In one (1) embodiment, the bottom of the groove 20B is radiused having a curve. In one (1) embodiment, the groove 20B has a semi-circular cross sectional shape. In one (1) embodiment, the shape of the groove 20B is similar to the cross sectional shape of the wire 100. In one (1) embodiment, the size of the groove 20B is selected depending on the size or diameter of the wire 100. In one (1) embodiment, the groove 20B is a standard size which is able to accommodate wire 100 having a variety of sizes or diameters.

In one (1) embodiment, the rollers 20 are positioned along a length of the inner passageway 22 between the ends 12A and 12B of the housing 12 so that when the wire 100 extends through the wire guide module 10, the rollers 20 do not overlap along the length of the wire 100 such that only one roller 20 contacts a section of the wire 100 at one time. In one (1) embodiment, the roller chambers 18 and rollers 20 are alternately spaced along the length of the inner passageway 22 so that the every other roller 20 is on the opposite side of the inner passageway 22. The alternating rollers 20 position the wire 100 in the inner passageway 22 to ensure that the wire 100 moves through the wire guide module 10 with a minimal amount of drag on the wire 100. In one (1) embodiment, where the inner passageway 22 of the wire guide module 10 has an arcuate shape, the number of rollers 20 between the inner passageway 22 and the inner side 12C of the housing 12 is greater than the number of rollers 20 between the inner passageway 22 and the outer side 12D of the housing 12. In one (1) embodiment, the rollers 20 are spaced approximately 1.5 inches (38.1 mm) apart. However, it is understood that the size and spacing of the rollers 20 can vary depending on the length and shape of the wire guide module 10 and the inner passageway 22 and the size of the wire 100. In one (1) embodiment, where the wire guide module 10 has a 45° arcuate shape and the inner passageway 22 of the wire guide module 10 has a 45° arcuate shape, the wire guide module 10 has a length of approximately 9 inches (229 mm) between the ends 12A and 12B of the housing 12, the wire guide module 10 has seven (7) rollers 20 with four (4) rollers 20 on side of the inner passageway 22 adjacent the inner side 12C of the housing 12 and three (3) rollers 20 on the opposite side of the inner passageway 22 adjacent the outer side 12D of the housing 12. The position and spacing of the rollers 20 ensures that the wire 100 moves easily within the wire guide module 10 with a minimum of friction and a minimum of drag. The spacing and size of the rollers 20 is selected so as to minimize the drag on the wire 100 as the wire 100 moves through the wire guide module 10. In one (1) embodiment, the spacing of the rollers 20 is selected so that as the wire 100 is moved through the wire guide module 10, the rollers 20 prevent the wire 100 from stretching or straightening so that the cast or helix of the wire 100 is maintained. The rollers 20 are freely rotating and rotate in response to the movement of the wire 100 through the wire guide module 10. To reduce the potential damage to the wire 100, the rollers 20 do not actively move the wire 100 but react to the movement of the wire 100 as the wire 100 is pulled or pushed through the wire guide module 10.

The rollers 20 can be any type of rollers well known in the art. In one (1) embodiment, all the rollers 20 are essentially identical. In one (1) embodiment, the rollers 20 are roller bearings 26. The roller bearings 26 have a cylindrical shape with a roller housing 24 and an inner bearing 25. The roller housing 24 has a center opening and the inner bearing 25 is mounted in the center opening. The inner bearing 25 has a center opening and is mounted on a mounting post 27 in the roller chamber 18 of the housing 12 so that the mounting post 27 extends through the center opening of the inner bearing 25. The inner bearing 25 includes an outer ring and an inner ring with ball bearings spaced between the rings. In one (1) embodiment, the rollers 20 are able to freely rotate on the mounting post 27. In one (1) embodiment, the roller housing 24 rotates on the inner bearing 25 when the wire 100 is in contact with the roller housing 24. In this embodiment, the outer ring of the inner bearing 25 is fixed to the roller housing 24 and rotates with the roller housing 24. The inner ring contacts the mounting post 27 and remains essentially stationary when the wire 100 is in contact with the roller housing 24 and moving in the wire guide module 10. In one (1) embodiment, the roller bearing 26 is cylindrical and the outer surface 24B of the roller housing 24 has a groove 24A extending completely around the circumference of the roller housing 24. In one (1) embodiment, the outer surface 24B of the roller housing 24 is constructed of a low friction material. In one (1) embodiment, the roller housing 24 is constructed of ferrous, non-ferrous or polymer materials. In one (1) embodiment, the rollers 20 are constructed of steel. In one (1) embodiment, the rollers 20 are constructed of ceramic.

In another (1) embodiment, the rollers are roller disks which have circular center disks with pins extending outward from each side. The pins extend into holes in the first and second sections of the housing. The center disks extend into the inner passageway and have a groove in the outer surface which contacts the wire 100. In this embodiment, the first and second sections of the roller chambers in the first and second sections of the housing are essentially identical.

In another embodiment, the rollers are hollow roller cylinders which are mounted in the inner passageway of the wire guide module 10. The wire 100 moves through the hollow roller cylinders. In this embodiment, the housing does not have roller chambers. In one (1) embodiment of this embodiment, the inner passageway has grooves around the inner circumference and the roller cylinders are mounted in the grooves. In one (1) embodiment, the roller cylinders are fixably mounted in the grooves. In another (1) embodiment, the roller cylinders can rotate in the grooves. In one (1) embodiment, the roller cylinders are constructed of ceramic.

Figure 11:
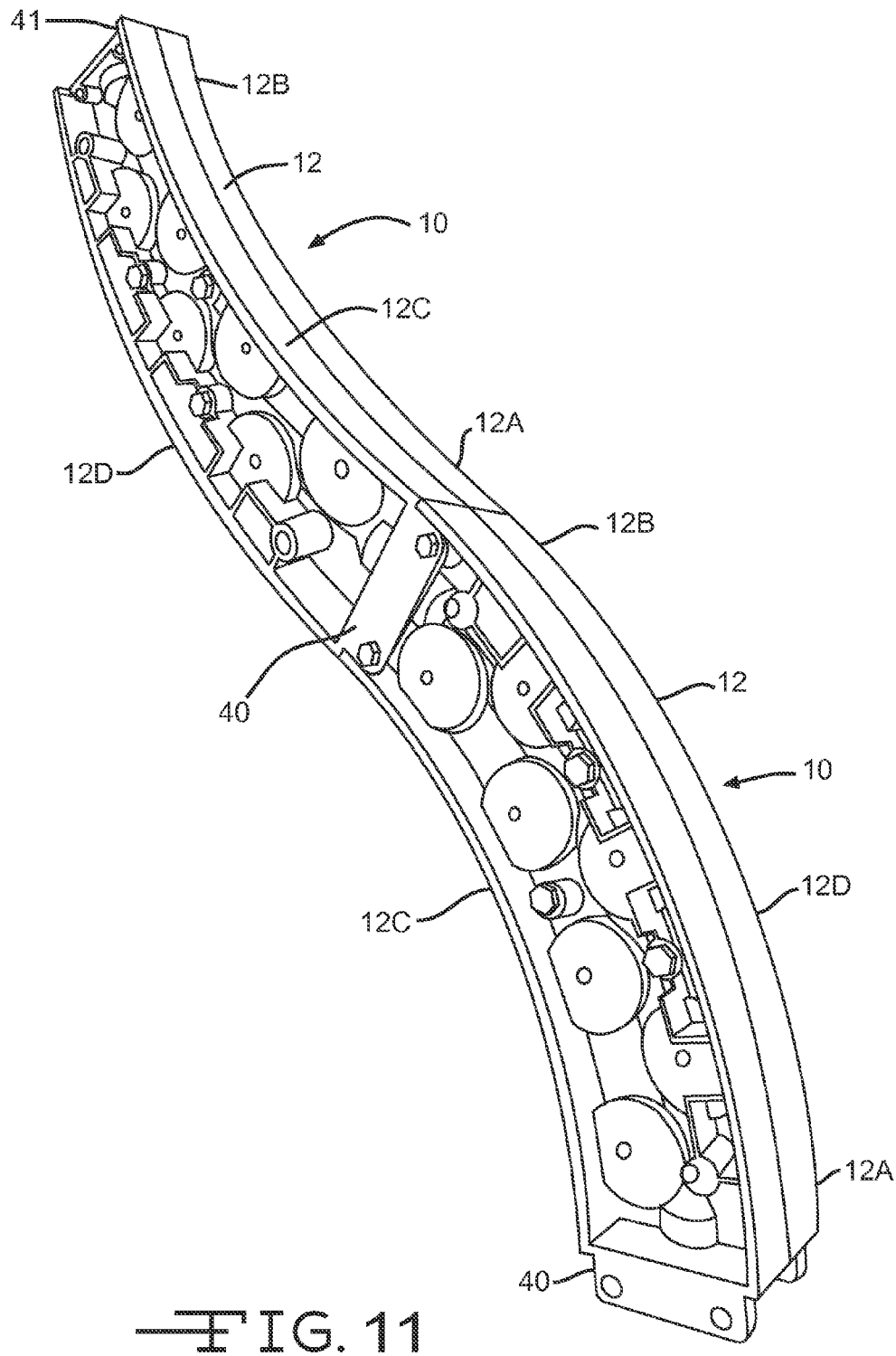
FIG. 11 is a perspective view of two wire guide modules 10 connected together to form an S-shaped wire guide component.

In one (1) embodiment, one end 12A of the housing 12 of the wire guide module 10 is provided with connector flanges 40. It is understood that the connector flanges 40 could be provided on either end 12A or 12B of the housing 12. The connector flanges 40 extend outward from the end 12A of the housing 12. The connector flanges 40 extend outward from the top surface of the housing 12 and from the bottom surface of the housing 12 in a spaced apart parallel relationship. The connector flanges 40 are located at the same end 12A of the housing 12 forming a male end of the wire guide module 10. The end 12B of the housing 12 without the connector flanges 40 has notches 41 in the top and bottom surfaces forming a female end of the wire guide module 10. The connector flanges 40 of the male end of a wire guide module 10 can be mated with the notches 41 in the female end of an adjacent wire guide module 10 to connect adjacent the wire guide modules 10 together, end to end (FIG. 11). In one (1) embodiment, the inner and outer sides 12C and 12D of the housing 12 extend outward toward the top and bottom surfaces of the wire guide module 10 a distance greater than the center sections of the housing 12 between the sides 12C and 12D of the housing 12 and the connector flanges 40 on the male end of the wire guide module 10 span the distance between the sides 12C and 12D of the housing 12 and the notches 41 in the female end of the wire guide module 10 extend between the sides 12C and 12D.

Figure 6:
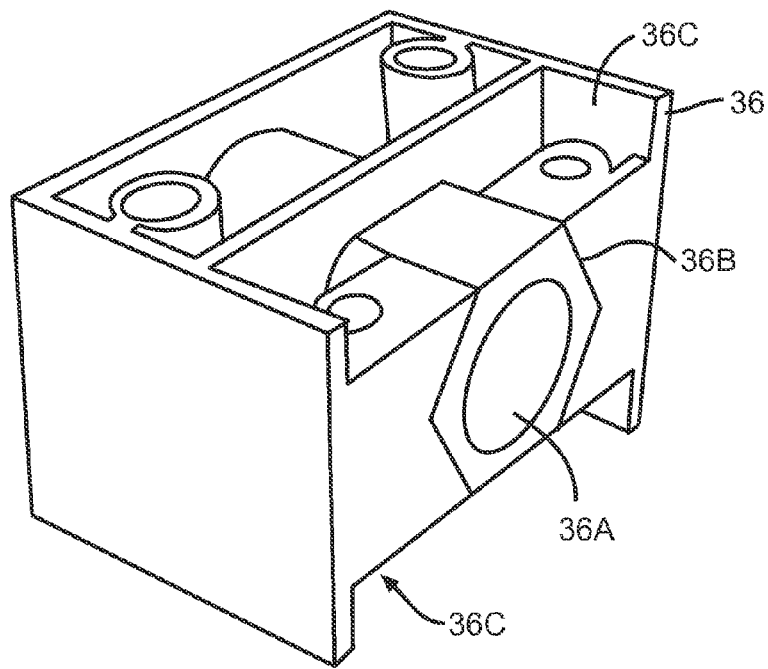
FIG. 6 is the female end cap 36 for the wire guide module 10.
Figure 7:
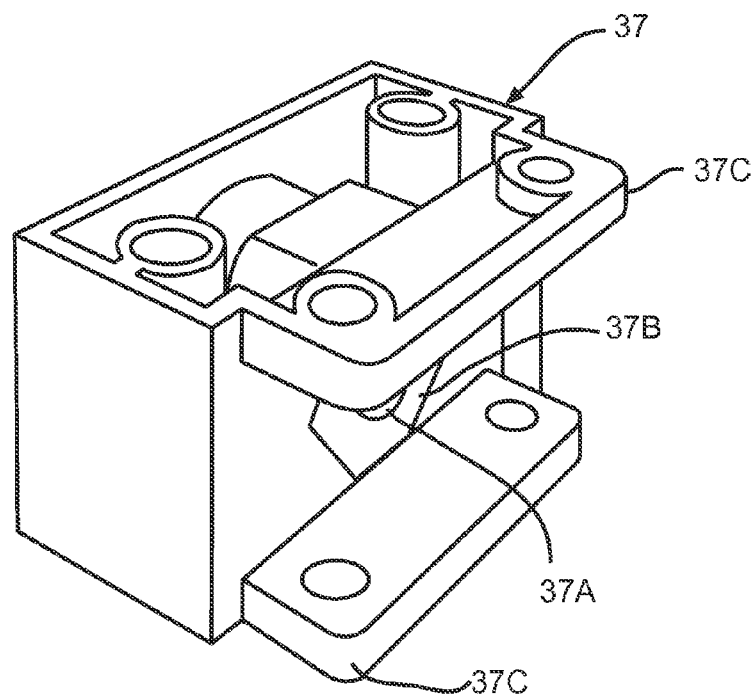
FIG. 7 is the male end cap 37 for the wire guide module 10.
Figure 8:
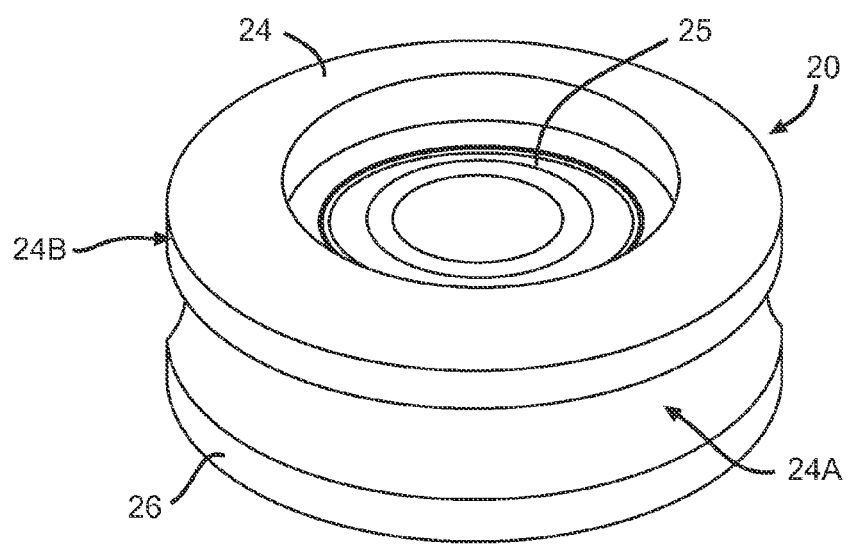
FIG. 8 is perspective view of one of the roller bearings 26.
Figure 9:
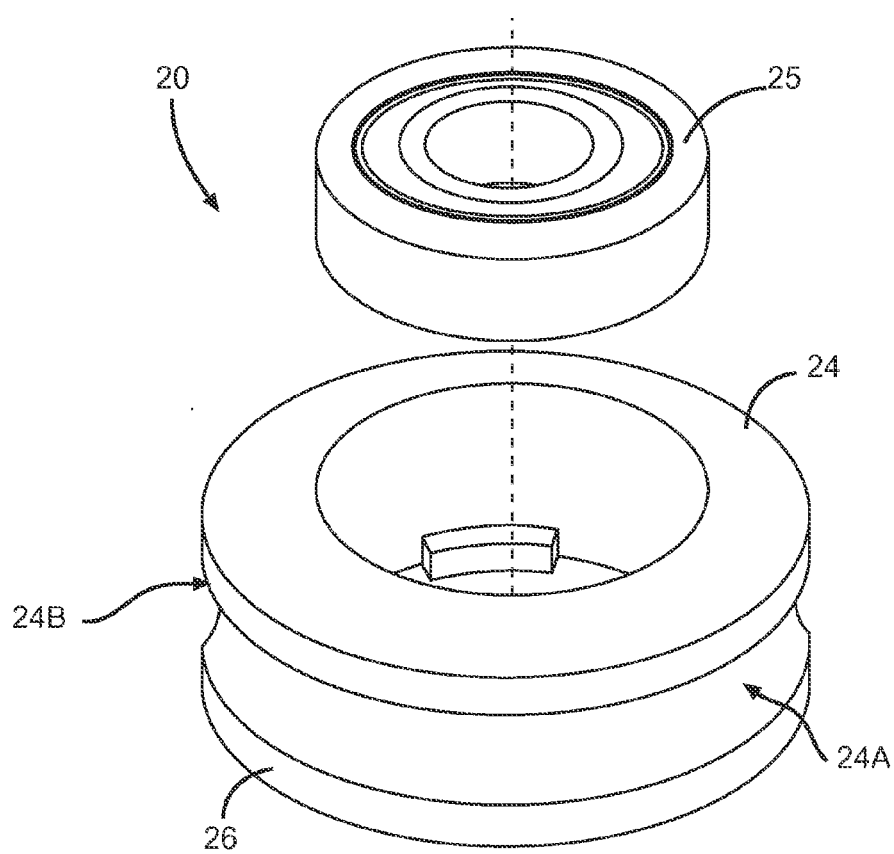
FIG. 9 is an exploded view of one of the rollers bearings 26 showing the roller housing 24 and the inner bearing 25.

Adapters or end caps 36 and 37 are optionally provided for connecting to the ends 12A and 12B of the wire guide module 10. The end caps 36 and 37 have opposed ends with a passageway 36A and 37A extending between the ends and openings in the ends extending into the passageway 36A and 37A (FIGS. 6 and 7). In one (1) embodiment, the end caps 36 and 37 are provided with fittings 36B and 37B in the passageway 36A and 37A to enable conduit 154 and other fittings from the wire dispensing system 150 to be easily connected to the ends 12A or 12B of the wire guide module 10 using the end caps 36 or 37. In one (1) embodiment, the fittings 36B and 37B are quick disconnect connectors. However, it is understood that the fittings 36B and 37B can be any type of fitting or connector well known in the art for use in wire dispensing systems 150 or for use in connecting flexible wire conduit 154 together. When the end caps 36 and 37 are mounted on the ends of the wire guide module 10, the openings into the passageway 36A and 37A of the end caps 36 and 37 are adjacent to and in communication with the openings 22A and 22B into the inner passageway 22 of the wire guide module 10 so that the passageways 36A and 37A of the end caps 36 and 37 are in communication with the inner passageway 22 of the wire guide module 10. The end caps 36 and 37 help to guide the wire 100 into and out of the inner passageway 22. The end caps 36 and 37 include a female end cap 36 (FIG. 6) for connecting to the male end of the wire guide module 10 and a male end cap 37 (FIG. 7) for connecting to the female end of the wire guide module 10. The female end cap 36 includes upper and lower notches 36C in the first end which mate with the connector flanges 40 on the male end of the wire guide module 10. The connector flanges 40 extend above and below the first end of the female end cap 36 forming an integral connection with the end cap 36. The male end cap 37 has upper and lower extensions 37C extending outward from the first end. The extensions 37C extend into the notches 41 in the female end of the wire guide module 10 to form an integral connection between the wire guide module 10 and the end cap 37. The end caps 36 and 37 can be secured to the ends of the wire guide module 10 by any means well known in the art. In one (1) embodiment, the end caps 36 and 37 are secured to the ends of the wire guide module 10 by bolts. The end caps 36 and 37 can also be used as brackets to allow for mounting or hanging the wire guide module 10 as part of the wire dispensing system 150. In one (1) embodiment, where two or more wire guide modules 10 are connected together, the end caps 36 and 37 are mounted on the ends of the wire guide module chain and not inbetween adjacent wire guide modules 10.

In one (1) embodiment, an insert 38 is mounted in the inner passageway 22 of the wire guide module 10 adjacent the openings 22A and 22B in each end 12A and 12B of the housing 12 of the wire guide module 10. The insert 38 assists in guiding the wire 100 into and out of the inner passageway 22 and helps align the wire 100 in the inner passageway 22. In one (1) embodiment, an insert 38 is provided with each end cap 36 and 37 and the insert 38 extends between the openings 22A and 22B of the inner passageway 22 of the wire guide module 10 and the openings into the passageway 36A and 37A of the end caps 36 and 37 to form a smooth transition between the inner passageway 22 and the passageways 36A and 37A of the end caps 36 and 37. In one (1) embodiment where two or more wire guide modules 10 are connected together, inserts 38 are mounted in each end 22A and 22B of the inner passageway 22 of each adjacent wire guide module 10 so that the inserts 38 extend between and into each of the inner passageways 22 of the adjacent wire guide modules 10 and assist in moving the wire 100 into the inner passageway 22 of the first wire guide module 10 in a chain and between two inner passageways 22 of two adjacent connected wire guide modules 10 and assist the wire 100 in exiting the last wire guide module 10 of the chain. In one (1) embodiment, the insert 38 is a hollow tube having an outer shape similar to the cross sectional shape of the inner passageway 22 (FIG. 4). In one (1) embodiment, where the inner passageway 22 has a cylindrical shape, the insert 38 has a cylindrical shape with a center bore. In one (1) embodiment, the openings in the ends of the insert 38 into the center bore of the insert 38 are tapered inward toward the center of the center bore to assist in guiding the wire 100 into the center of the center bore of the insert 38. In one (1) embodiment, the insert 38 is constructed of plastic. In one (1) embodiment, the insert 38 is constructed of the same material as the housing 12 of the wire guide module 10.

In one (1) embodiment, the wire guide module 10 is constructed of an injection molded polymer. In one (1) embodiment, the wire guide module 10 is constructed of any lightweight durable material well known in the art. In one (1) embodiment, the wire guide module 10 is constructed of a ferrous, non-ferrous or polymer material. In one (1) embodiment, the weight of the wire guide module 10 is reduced by removing unnecessary housing material surrounding the roller chambers 18.

In one (1) embodiment, the housing 12 is constructed of a first section, 14 and a second section 16. The first and second sections 14 and 16 are secured together to form the complete housing 12. The first and second sections 14 and 16 can be secured together by any means well known in the art. In one (1) embodiment, the first and second sections 14 and 16 are secured together by bolts 46 which extend through the first and second sections 14 and 16. To form the first and second sections 14 and 16, the housing 12 is divided along the plane A formed between the ends 12A and 12B and the sides 12C and 12D of the housing 12 (FIG. 1). The first section 14 of the housing 12 includes the first section 14A of the inner passageway 22. The second section 16 of the housing 12 includes the second section 16A of the inner passageway 22. When the first and second sections 14 and 16 of the housing 12 are mated together, the first and second sections 14A and 16A form the inner passageway 22 of the housing 12. The first section 14 of the housing 12 includes the first section 14B of the roller chambers 18. The second section 16 of the housing 12 includes the second section 16B of the roller chambers 18 for mounting the rollers 20. When the first and second sections 14 and 16 of the housing 12 are mated together, the first and second sections 14B and 16B form the roller chambers 18 for the rollers 20. In this embodiment, the first and second sections 14 and 16 of the housing 12 are essentially identical except that the second section 16B of the roller chambers 18 has the mounting posts 27 for mounting the rollers 20 and the first section 14B of the roller chambers 18 has the holes 14C for receiving the mounting posts 27. The first section 14 of the housing 12 has a connector flange 40 on the bottom surface of the wire guide module 10 on the side opposite the second section 16.

The second section 16 of the housing 12 has a connector flange 40 on the top surface of the wire guide module 10 on the side opposite the first section 14. In one (1) embodiment, the inner surfaces of the first and second sections 14 and 16 which are in contact when the first and second sections 14 and 16 are secured together to form the housing 12, are essentially flush. In one (1) embodiment, no portion of the first section 14 extends into the second section 16 and the only portion of the second section 16 which extends into the first section 14 are the mounting posts 27 for the rollers 20. When the rollers 20 are mounted in the roller chambers 18, the rollers 20 extend between the first and second sections 14 and 16 and are located essentially an equal amount in the first and second sections 14 and 16 of the housing 12.

The wire guide module 10 can have a variety of shapes. It is understood that the housing 12 can have a variety of shapes and that it is the shape of the inner passageway 22 between the ends 12A and 12B of the housing 12 that determines the direction of movement of the wire 100. In one (1) embodiment, the inner passageway 22 of the wire guide module 10 has an arcuate shape. In one (1) embodiment, the inner passageway 22 of the wire guide module 10 has a 45° arcuate shape. In one (1) embodiment, the inner passageway 22 of the wire guide module 10 has a 60° arcuate shape. In one (1) embodiment, the inner passageway 22 of the wire guide module 10 has a 90° arcuate shape. In one (1) embodiment, the housing 12 is constructed of a rigid or substantially non-flexible material and the arcuate shape of the inner passageway 22 of the wire guide module 10 cannot be changed without damaging the wire guide module 10.

In one (1) embodiment, the wire guide module 10 is provided with a mounting bracket to allow for mounting the wire guide module 10 in various positions. In one (1) embodiment, the mounting bracket is pivotally mounted to the wire guide module 10 so that the position of the wire guide module 10 can be easily varied. In one (1) embodiment, the wire guide module 10 has a pair of mounting brackets adjacent the first and second sections 14 and 16 of the housing 12 on opposed sides of the housing 12. It is understood that a variety of types of mounting brackets can be used to mount the wire guide module 10 for use in a wire dispensing system 150. In one (1) embodiment, the wire guide module 10 has a hanger bracket.

In one (1) embodiment, a pivot support bracket 42 is provided for mounting one or more the wire guide modules 10 connected together. In one (1) embodiment, the pivot support bracket 42 is mounted at the connection point of two (2) wire guide modules 10. The pivot support bracket 42 has a pivot rod 44 which allows the wire guide module 10 to be supported in a pivotable manner. In one (1) embodiment, the pivot support bracket 42 is connected to a tool balancer. In one (1) embodiment, the pivot support bracket 42 has an essentially triangular shape with the base of the triangle attached to the ends of the wire guide module 10 and the apex of the triangle being used at the attachment point for hanging or supporting the wire guide module 10. In one (1) embodiment, the pivot rod 44 is located at the apex of the pivot support bracket 42. The pivot support bracket 42 can also be used to hang or mount a single wire guide module 10 or multiple wire guide modules 10 connected together to form a wire guide component.

The wire guide module 10 is used to guide the wire 100 and to change the direction of the movement of the wire 100 in a wire dispensing system 150. The wire guide module 10 can be used with sections of conduit 154 as part of a wire dispensing system 150 to guide and move wire 100 from a wire source 152 to a welding station. The wire guide module 10 can be used with any type or size or shape of wire 100. The inner passageway 22 of the wire guide module 10 can have a variety of diameters to accommodate wires 100 of all diameters and casts. In one (1) embodiment, the size of the wire 100 is not greater than 3/16 inch diameter (4.76 ram). Two or more wire guide modules 10 can be secured together directly to form a wire guide component having a variety of shapes and curves as necessary to guide the wire 100 in the correct direction. In one (1) embodiment, the wire guide modules 10 which are connected together are essentially identical. The wire guide modules 10 can be connected together in any orientation. In one (1) embodiment, the wire guide modules 10 are connected together by a swivel connector. In addition, the wire guide modules 10 can be flipped over such that the top surface of the first wire guide module 10 is adjacent the bottom surface of the second wire guide module 10. Each individual wire guide module 10 has a fixed shape. In one (1) embodiment, where the inner passageway 22 of the wire guide module 10 has a 45° arcuate shape, two (2) wire guide modules 10 can be secured together to form a 90° wire guide component having an inner passageway 22 with a 90° arcuate curve. In this embodiment, the second end of the first wire guide module 10 is secured to the first end of the second wire guide module 10 by a pair of connectors and the inner passageway 22 of the first wire guide module 10 is in communication with the inner passageway 22 of the second wire guide module 10. The second end of the first wire guide module 10 is connected to the first end of the second wire guide module 10 with the top surface of the first wire guide module 10 adjacent and aligned with the top surface of the second wire guide module 10. In one (1) embodiment, the wire guide modules 10 are connected together using the connector flanges 40. However, it is understood that any connection means well known in the art can be used to connect the wire guide modules 10 together. In one (1) embodiment, an elbow bracket is used to secure the first and second wire guide modules 10 together. In one (1) embodiment, a pair of elbow brackets are used to secure the two (2) wire guide modules 10 together. In one (1) embodiment, where the wire guide module 10 has a 45° arcuate shape, two (2) wire guide modules 10 can be secured together to form an S-shaped wire guide component having an inner passageway 22 with a an S-shape (FIG. 11). Ira this embodiment, the second end of the first wire guide module 10 is secured to the first end of the second wire guide module 10 and the top surface of the first wire guide module 10 is adjacent and aligned with the bottom surface of the second wire guide module 10 and the inner passageway 22 of the first wire guide module 10 is in communication with the inner passageway 22 of the second wire guide module 10. In the embodiment where the housing 12 of the wire guide module 10 is constructed of first and second sections 14 and 16, the wire guide modules 10 can be connected together with the first section 14 of the first wire guide module 10 adjacent the first section 14 of the second wire guide module 10 or with the first section 14 of the first wire guide module 10 adjacent the second section 16 of the second wire guide module 10. The construction of the wire guide module 10 allows the wire guide module 10 to be used in any orientation. The shape and construction of the wire guide module 10 allows the wire 100 to enter the inner passageway 22 of the wire guide module 10 from either end of the wire guide module 10 so that the wire guide module 10 can be used in a variety of positions.

Figure 10:
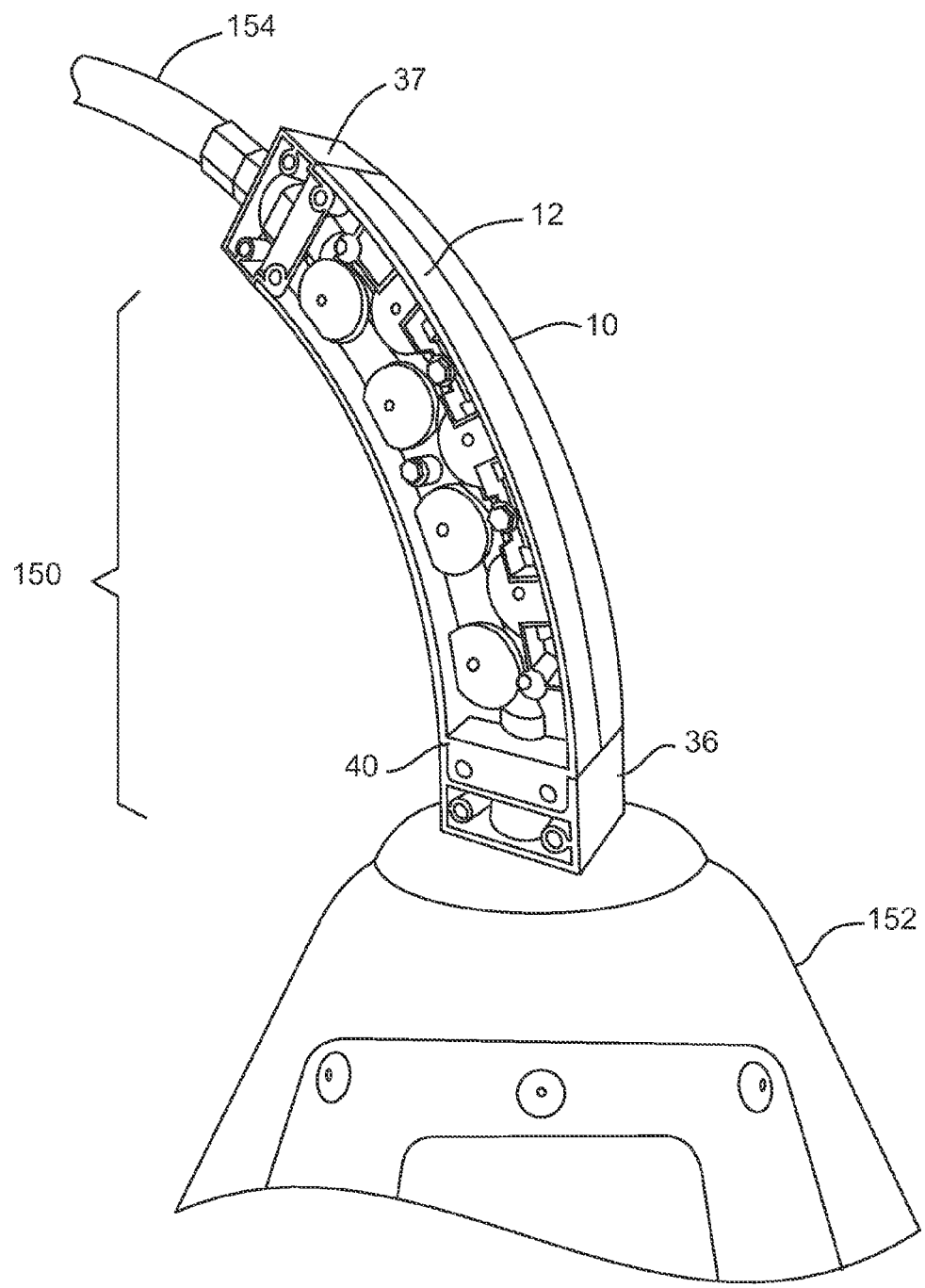
FIG. 10 is a perspective view of the wire guide module 10 mounted directly on a wire dispensing container 152.

The wire guide module 10 can be used in a wire dispensing system 150. In one (1) embodiment, the wire dispensing system 150 is used to dispense wire 100 to a welding site. The system 150 can include a wire dispensing container 152, a means for moving the wire 100, wire guide modules 10, end caps 36 and 37 for the wire guide modules 10 and flexible conduit 154. The various components of the system 150 are selected and connected together to create a path from the wire source in the container 152 to the welding station. The wire guide modules 10 and the conduit 154 are used to change the direction of the wire 100. The flexible conduit 154 has an inner passageway for the wire 100 and can extend between the wire guide modules 10 to move wire 100 between the wire guide modules 10. The conduit 154 can be connected to the wire guide modules 10 by any means well known in the art. In one (1) embodiment, the wire guide modules 10 are used to make significant direction changes in the wire 100 such as to enable the wire 100 to be moved around corners. The wire guide modules 10 allow for turning the wire 100 or guiding the wire 100 in different directions using arcuate turns. The wire guide modules 10 reduce the friction and drag on the wire 100 as the wire 100 is moved through turns and curves in the wire dispensing system 150. As the wire 100 moves along the inner passageway 22 of the wire guide module 10, the wire 100 contacts the rollers 20. The movement of the wire 100 rotates the rollers 20 such that the rollers 20 rotate in a direction of movement of the wire 100. The rotation of the rollers 20 allows the wire 100 to move more easily through the wire guide module 10 with less friction and drag and allows the direction of the movement of the wire 100 to be changed without stopping the movement of the wire 100 and without damaging the wire. In one (1) embodiment, the wire guide modules 10 enable more dramatic or sharp turns than can be achieved by using flexible conduit 154 alone. In one (1) embodiment where the wire guide module 10 has an arcuate shape with a shorter, inner side 12C and a longer, outer side 12D and the inner passageway 22 has an arcuate shape, as the wire 100 moves through the wire guide module 10, the wire 100 follows the shape of the inner passageway 22 which changes the direction of the wire 100. As the wire 100 moves through the inner passageway 22 and curves along the arcuate shape of the inner passageway 22, the wire 100 contacts the rollers 20 along the inner edge of the inner passageway 20. Thus, the wire 100 contacts the rollers 20 spaced between the shorter, inner side 12C of the housing 12 of the wire guide module 10 and the inner passageway 22. In one (1) embodiment of this embodiment, the wire 100 does not, under standard operating, conditions contact the rollers 20 spaced adjacent the outer edge of the inner passageway 22 between the longer, outer side 12D of the housing 12 and the inner passageway 22. In one (1) embodiment, a wire guide module 10 is mounted directly on the wire dispensing container 152. In one (1) embodiment, the wire dispensing container 152 has a wire dispensing cone and the wire guide module 10 is connected directly to the cone (FIG. 10). In one (1) embodiment, the wire dispensing container 152 has a fitting which mates with the fitting 36B of the end cap 36 on the end of the wire guide module 10.

In the foregoing description, various features of the present invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are here by incorporated by reference herein in their entirety, with each claim standing on its own as a separate embodiment of the present invention.

It is intended that the foregoing description be only illustrative of the present invention and that the present invention be limited only by the hereinafter appended claims.

I claim:

1. A wire guide module, which comprises:
a housing having a first end and a second end with a first lateral side and a second lateral side extending from the first end to the second end, the first lateral side defining a first side surface and the second lateral side defining a second lateral side surface;
an inner passageway defined by the housing and having a fixed shape and extending through the housing from the first end of the housing to the second end of the housing, the inner passageway having a longitudinal length extending from the first end of the housing to the second end of the housing, with openings in the first and second ends of the housing in communication with the inner passageway, wherein the first lateral side is on one lateral side of the passageway and the second lateral side is on the other lateral side of the passageway, such that the passageway is positioned laterally between the first and second lateral sides; and
a plurality of first rollers mounted in the first lateral side of the housing, each first roller of the plurality of first rollers disposed at an individual location along the length of the inner passageway and positioned laterally between the first lateral side surface of the housing and the inner passageway;
a plurality of second rollers mounted in the second lateral side of the housing, each second roller of the plurality of second rollers disposed at an individual location along the length of the inner passageway and positioned laterally between the second lateral side surface of the housing and the inner passageway;
wherein the plurality of first rollers and the plurality of second rollers are located at discrete, fixed, and non-adjustable lateral and longitudinal positions relative to the housing;
wherein the passageway is defined in part by an inner passageway wall that extends on one lateral side of the housing between adjacent first rollers and that extends on the other lateral side of the housing between adjacent second rollers;
wherein each individual first roller of the plurality of first rollers are offset lengthwise relative to each individual second roller of the plurality of second rollers along the length of the inner passageway such that each individual first roller of the plurality of first rollers do not laterally overlap any of each individual second roller of the plurality of second rollers along the length of the inner passageway such that all of the first rollers mounted in the first lateral side of the housing are longitudinally staggered relative to all of the second rollers mounted in the second lateral side of the housing;
wherein the plurality of first rollers are spaced apart longitudinally from each other, and there are no other rollers disposed longitudinally between each individual first roller of the plurality of first rollers on the first lateral side;
wherein the plurality of second rollers are spaced apart longitudinally from each other, and there are no other rollers disposed longitudinally between each individual second roller of the plurality of second rollers on the second lateral side;

wherein at each individual longitudinal position of each individual first roller of the plurality of first rollers disposed in the first lateral side of the housing, there is no second roller disposed at the same longitudinal position in the second lateral side of the housing such that there is only one roller of the plurality of first rollers and plurality of second rollers disposed laterally adjacent the inner passageway;

wherein at each individual longitudinal position of each individual second roller of the plurality of second rollers disposed in the second lateral side of the housing, there is no first roller disposed at the same longitudinal position in the first lateral side of the housing such that there is only one roller of the plurality of first rollers and plurality of second rollers disposed laterally adjacent the inner passageway;

wherein the housing is free from any rollers on the second lateral side in areas laterally opposite and across the passageway from the individual locations of the plurality of first rollers disposed in the first lateral side of the housing, and the housing is free from any rollers on the first lateral side in areas laterally opposite and across the passageway from the individual locations of the plurality of second rollers disposed in the second lateral side of the housing.

2. A wire guide module, which comprises:

a) a housing having a first end and a second end with a first side and a second side extending longitudinally from the first end to the second end and a first surface and a second surface extending longitudinally from the first end to the second end, the first and second surface also extending laterally from the first side to the second side of the housing, the first end of the housing defining a first end face arranged transverse to both the first and second sides and also the first and second surfaces, the housing further having a first connector flange extending directly from the first surface and the first end face and longitudinally outward therefrom, the housing further having a second connector flange extending directly from the second surface and the first end face and longitudinally outward therefrom, wherein the first connector flange is spaced apart and parallel to the second connector flange, wherein the first and second connector flanges have a planar shape, wherein the first connector flange and second connector flange extend in the same longitudinal direction directly from the first end face;

b) an inner passageway extending through the housing from the first end to the second end of the housing with openings in the first and second ends of the housing in communication with the inner passageway; and c) a plurality of rollers mounted in the housing adjacent the inner passageway.

3. The wire guide module of claim 2 wherein the second end of the housing defines a second end face arranged transverse to the first and second sides and the first and second surfaces, and the second end of the housing defines notches in the first and second surfaces of the housing, the notches extending longitudinally inward into the housing directly from the second end face.

4. The wire guide module of claim 1 wherein the rollers extend into the inner passageway.

5. The wire guide module of claim 4 wherein the rollers have a cylindrical shape with an outer surface having a groove and wherein the rollers are positioned adjacent the inner passageway so that a bottom of the groove is in the inner passageway.

6. The wire guide module of claim 5 wherein the housing has a first surface and a second surface extending longitudinally between the ends and laterally between the side surfaces of the housing and wherein the bottom of the groove of the rollers is essentially evenly spaced between the first and second surfaces of the housing.

7. The wire guide module of claim 5 wherein the rollers have a roller housing rotatably mounted on an inner bearing.

8. The wire guide module of claim 7 wherein the roller housing has roller chambers having mounting posts, wherein the inner bearings of the rollers have a center opening adapted to be mounted on the mounting posts and wherein the rollers are rotatably mounted in the roller chambers on the mounting posts.

9. The wire guide module of claim 8 wherein the rollers are mounted on the mounting posts so as to freely rotate on the mounting posts.

10. The wire guide module of claim 2 wherein a first end cap having a passageway with a fitting in the passageway is mounted on the first end of the housing so that the passageway of the first end cap is in communication with the inner passageway of the housing.

11. The wire guide module of claim 10 wherein the first end cap defines an end face and has notches at one end extending inward into the end cap from the end face, wherein the notches are disposed in opposite surfaces of the end cap and the notches mate with the connector flanges on the first end of the housing such that the notches receive the first and second connector flanges to connect the first end cap to the first end of the housing wherein the one end of the first end cap is disposed between the first and second connector flanges on the first end of the housing.

12. The wire guide module of claim 3 wherein a second end cap defines an end face at one end and includes extensions that extend directly outward from the end face in the same direction and from opposite surfaces of the second end cap at the one end in a spaced apart parallel relationship, and the second end cap is mounted on the second end of the housing so that the extensions extend into the notches in the second end of the housing, and the second end of the housing is disposed between the extensions.

13. The wire guide module of claim 10 wherein an insert having a center bore is mounted in and extends into and between the inner passageway of housing and the passageway of the first end cap.

14. The wire guide module of claim 1 wherein ends of the inner passageway adjacent the ends of the housing are enlarged so that the openings at each end of the housing into the inner passageway have a cross-sectional size greater than a cross-sectional size of the inner passageway.

15. The wire guide module of claim 14 wherein the inner passageway has a cylindrical shape and a diameter of the openings in the ends of the housing is greater than a diameter of the inner passageway.

16. The wire guide module of claim 1 wherein the housing is constructed of a rigid material that extends from the first end to the second end and the side surfaces of the housing have a fixed arcuate shape between the ends.

17. The wire guide module of claim 16 wherein the inner passageway has a fixed arcuate shape along a length of the inner passageway between the ends of the housing and between at least two of the first rollers.

18. The wire guide module of claim 17 wherein the inner passageway is evenly spaced between the side surfaces of the housing so that a longitudinal shape of the inner passageway corresponds to the shape of the side surfaces of the housing between the ends.

19. The wire guide module of claim 18 wherein a longitudinal center of the housing is aligned with and the same as the longitudinal center of the inner passageway of the housing.

20. The wire guide module of claim 2 wherein the housing has a first section and a second section which are removably connected together along a plane extending between the sides and ends of the housing to form the housing and wherein the first and second connector flanges extend outward parallel to the plane.

21. The wire guide module of claim 20 wherein the first section of the housing has a first section of the inner passageway and the second section of the housing has a second section of the inner passageway.

22. A method for guiding wire from a wire source to a weld station, which comprises the steps of:
   a) providing a container for the wire source;
   b) providing at least two wire guide modules each having a housing constructed of a rigid and non-flexible material and having a first end and a second end with a first side and a second side extending between the ends, an inner passageway extending through the housing between the ends and the sides of the housing having a length between the ends of the housing with a fixed arcuate shape along the length and having openings in the first and second ends of the housing in communication with the inner passageway, and a plurality of rollers mounted in the housing adjacent the inner passageway, wherein the rigid and non-flexible material extends from the first end of the housing to the second end of the housing to define the fixed arcuate shape along the length between the ends;
   c) providing a first end cap having a passageway and adapted to be mounted on the first end of the housing of one of the wire guide modules;
   d) providing a second end cap having a passageway and adapted to be mounted on the second end of the housing of the other of the wire guide modules;
   e) providing a conduit having opposed ends with a passageway extending therebetween;
   f) connecting the wire guide modules, end caps and conduit together in a correct configuration between the container and the weld station so that the wire guide modules are combined into a wire guide component that is formed by the two wire guide modules, and the wire guide component includes an extended inner passageway formed by the combination of the inner passageways of the wire guide modules, and the extended inner passageway is in communication with the passageways of the end caps and conduit, wherein each wire guide module has a fixed arcuate shape prior to connecting the end caps and wire guide modules together and maintains the same fixed arcuate shape after connecting the end caps and wire guide modules together; and
   g) feeding the wire from the wire source in the container through the passageways of the wire guide component, end caps and conduit to the weld station.

23. The method of claim 22 wherein each wire guide module has the fixed arcuate shape, wherein a first side of the housing is curved and shorter than a curved second side of the housing, and wherein further in step f), as the wire moves through the wire guide module, a direction of the wire is changed and the wire contacts the rollers positioned between the first side of the housing and the inner passageway.

24. The method of claim 23 wherein the wire guide modules are connected together so that the first end of one of the wire guide modules is connected to the second end of the other of the wire guide modules so that the first side of the housing of the one of the wire guide modules is adjacent the first side of the housing of the other of the wire guide modules so that the inner passageway of one of the wire guide modules is in communication with the inner passageway of the other of the wire guide modules so that the wire guide component is formed from the two connected modules and the wire guide component has the extended inner passageway with a fixed accurate shape with a curvature longer than the curvature of each of the inner passageways of the wire guide modules.

25. The method of claim 22 wherein the wire guide modules are connected together so that the first end of one of the wire guide modules is connected to the second end of the other of the wire guide modules so that the first side of the housing of the one of the wire guide modules is adjacent the second side of the housing of the other of the wire guide modules so that the inner passageway of one of the wire guide modules is in communication with the inner passageway of the other of the wire guide modules so that the wire guide component is formed from the two connected modules and the wire guide component has the extended inner passageway with an S-shape.

26. A method for guiding wire from a wire source to a weld station, which comprises the steps of:
   a) providing a container for the wire source;
   b) providing a wire guide module, which comprises:
      a housing having a first end and a second end with a first lateral side and a second lateral side extending from the first end to the second end, the first lateral side defining a first side surface and the second lateral side defining a second lateral side surface;
      an inner passageway extending through the housing from the first end of the housing to the second end of the housing, the inner passageway having a longitudinal length extending from the first end of the housing to the second end of the housing, with openings in the first and second ends of the housing in communication with the inner passageway, wherein the first lateral side is on one lateral side of the passageway and the second lateral side is on the other lateral side of the passageway, such that the passageway is positioned laterally between the first and second lateral sides; and
      a plurality of first rollers mounted in the first lateral side of the housing, each first roller of the plurality of first rollers disposed at an individual location along the length of the inner passageway and positioned laterally between the first lateral side surface of the housing and the inner passageway;
      a plurality of second rollers mounted in the second lateral side of the housing, each second roller of the plurality of second rollers disposed at an individual location along the length of the inner passageway and positioned laterally between the second lateral side surface of the housing and the inner passageway;
      wherein each individual first roller of the plurality of first rollers are offset lengthwise relative to each individual second roller of the plurality of second rollers along the length of the inner passageway such that each individual first roller of the plurality of first rollers do not laterally overlap any of each individual second roller of the plurality of second rollers along the length of the inner passageway such that all of the first rollers mounted in the first lateral side of the housing are longitudinally staggered relative to all of the second rollers mounted in the second lateral side of the housing;

wherein the plurality of first rollers are spaced apart longitudinally from each other, and there are no other rollers disposed longitudinally between each individual first roller of the plurality of first rollers on the first lateral side;

wherein the plurality of second rollers are spaced apart longitudinally from each other, and there are no other rollers disposed longitudinally between each individual second roller of the plurality of second rollers on the second lateral side;

wherein at each individual longitudinal position of each individual first roller of the plurality of first rollers disposed in the first lateral side of the housing, there is no second roller disposed at the same longitudinal position in the second lateral side of the housing such that there is only one roller of the plurality of first rollers and plurality of second rollers disposed laterally adjacent the inner passageway;

wherein at each individual longitudinal position of each individual second roller of the plurality of second rollers disposed in the second lateral side of the housing, there is no first roller disposed at the same longitudinal position in the first lateral side of the housing such that there is only one roller of the plurality of first rollers and plurality of second rollers disposed laterally adjacent the inner passageway;

wherein the housing is free from any rollers on the second lateral side in areas laterally opposite and across the passageway from the individual locations of the plurality of first rollers disposed in the first lateral side of the housing, and the housing is free from any rollers on the first lateral side in areas laterally opposite and across the passageway from the individual locations of the plurality of second rollers disposed in the second lateral side of the housing;

c) providing a first end cap having a passageway and adapted to be mounted on the first end of the housing of the wire guide module;

d) providing a second end cap having a passageway and adapted to be mounted on the second end of the housing of the wire guide module;

e) providing a conduit having opposed ends with a passageway extending therebetween;

f) connecting the wire guide module, end caps and conduit together in a correct configuration between the container and the weld station so that the inner passageway of the wire guide module is in communication with the passageways of the end caps and conduit; and g) feeding the wire from the wire source in the container through the passageways of the wire guide module, end caps and conduit to the weld station.

* * * * *